Dec. 17, 1929. C. MARCH Re. 17,532

COMPOUND TOOL

Original Filed March 16, 1926

Carl March, INVENTOR

BY Victor J. Evans

ATTORNEY

William Thompson

WITNESS:

BEST AVAILABLE COPY

Reissued Dec. 17, 1929

Re. 17,532

UNITED STATES PATENT OFFICE

CARL MARCH, OF CHICAGO, ILLINOIS

COMPOUND TOOL

Original No. 1,664,783, dated April 3, 1928, Serial No. 95,115, filed March 16, 1926. Application for reissue filed January 11, 1929. Serial No. 331,746.

The present invention relates to a compound tool for use principally in bakeries, restaurants, and the like for facilitating the turning over of fried cakes or the like, while the same are being baked.

A further object is to provide a tool which has associated therewith means for puncturing the air pockets formed in the cakes while the same are being fried.

Another object of the invention is to provide a tool which is especially adapted for use in bakeries for turning over fried cakes and doughnuts, which are fried in a kettle of hot grease, an important object of the invention being to combine with the tool, means for measuring the amount of grease in the kettle, so that a proper amount of grease may be constantly maintained.

A further object of the invention is to provide a tool having a shank formed with a series of spaced air openings to prevent heat from travelling up the shank to the handle and burning the hand of the user.

A still further object is to provide an implement of the above mentioned character which is simple in construction, inexpensive, strong, and durable and further well adapted to the purpose for which it is designed.

Other objects and advantages of the invention will become apparent during the course of the following description taken in connection with the accompanying drawing.

In the accompanying drawing forming a part of this application, and in which like numerals designate like parts throughout the several views.

Figure 2:
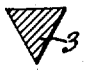
Figure 2 is a transverse section taken approximately on line 2—2 of Figure 1 looking in the direction of the arrows.
Figure 3:
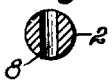
Figure 3 is a similar section taken on line 3—3 of Figure 1.

In the drawing, wherein for the purpose of illustration is shown the preferred embodiment of my invention, the numeral 1 designates generally the compound tool, the same comprising an elongated rod 2, which has formed on one end thereof the enlargd portion 3 which is substantially triangular in cross section as is more clearly illustrated in Figure 2. This triangular shaped enlarged portion 3 has its outer end gradually tapered to provide the point 4, the purpose of which will be hereinafter more fully described.

The other end of the rod 2 is bent back upon itself to form the looped handle portion 5, the loop 6 formed by the handle 5 being of sufficient length as to permit two or three fingers of the person using the implement to be inserted therethrough for efficiently grasping the tool.

Furthermore, the looped handle may be suspended from a suitable hook or the like when not in use.

When frying cakes or doughnuts in hot grease, it is important to keep the grease at a proper depth and to turn the cakes or doughnuts during the frying operation, and as the cook must be provided with a tool or implement for the last mentioned purpose, the present invention combines with this tool or implement, means for measuring the grease, so that a single tool or implement will suffice for both purposes.

Figure 1:
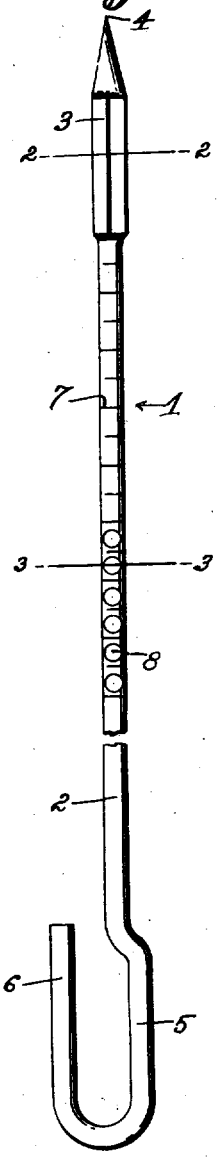
Figure 1 is a side elevation of the compound tool embodying my invention.

As is clearly illustrated in Figure 1, the major portion of the rod 2 is provided with grease depth graduations such as are indicated at 7 whereby said rod will form a measuring implement for measuring the quantity of grease which is contained within a receptacle, and it is obvious that when the pointed end of the rod is inserted downwardly in the receptacle so that the same touches the bottom of the receptacle, the amount of grease in the receptacle may be readily and easily ascertained.

A series of air holes 8 are arranged in spaced relation in the intermediate portion of the rod 2, and the purpose of these air holes is to provide a means for preventing the heat travelling upwardly on the rod to the handle portion thereof, and burning the hand of the person holding the implement.

In using the implement for turning buckwheat cakes, fried cakes, or the like, which are being fried on a griddle plate, the pointed end of the rod is inserted beneath the cake so that one of the flat sides of the enlarged portion 3 will rest on the plate and the sharpened upper edge will engage the under side of the cake to facilitate the turning over of the same when the rod is given a turn in either direction. The point 4 is adapted to be used in breaking the air blisters or pockets which are formed in the cake during the frying thereof and this is accomplished by puncturing such pockets with the point 4.

The provision of an implement of the above mentioned character will obviate the necessity of having to provide a number of independent implements for accomplishing the various results attained by my improved implement, and furthermore the simplicity in which my device is constructed renders the same very inexpensive in its manufacture.

If desired, the handle portion of the rod may be flattened and suitable advertising indicia stamped thereon.

While I have shown the preferred embodiment of my invention it is to be understood that minor changes in the size, shape, and arrangement of parts may be resorted to without departing from the spirit of the invention and the scope of the appended claims.

Having thus described the invention, what I claim as new and desire to secure by Letters Patent is:

1. An implement for turning over fried cakes while being baked on a griddle, comprising an elongated solid rod, one end thereof being enlarged, the enlarged end of the rod being substantially triangular in cross section, one flat face of the triangular portion adapted to rest on the griddle while the apex portion of the triangular portion engages the under side of the cake, the outer end of the triangular shaped enlarged portion being tapered to provide a point which tapered portion is circular in cross section, said pointed end facilitating the insertion of the implement beneath the cake and further facilitating the proper positioning of the triangular portion beneath the cakes to effect the turning of the same, the outer end of the rod being formed with a handle, the intermediate portion of the rod being provided with a series of air holes.

2. An implement for turning articles cooked in hot grease comprising a shank having a pointed extremity and an integral handle at the other extremity, said shank formed to retard the travel of heat and with graduations for measuring the depth of grease.

CARL MARCH.